United States Patent Office 3,491,150
Patented Jan. 20, 1970

3,491,150
AMINOHYDROXYHEXAHYDROCYCLOPENTA-
DIBENZOCYCLOOCTENES
Eugene E. Galantay, Morristown, N.J., assignor to
Sandoz Inc., Hanover, N.J.
No Drawing. Original application May 14, 1965, Ser. No.
455,989. Divided and this application Feb. 24, 1969,
Ser. No. 801,803
Int. Cl. C07d 29/10, 27/04; C07c 111/00
U.S. Cl. 260—566                                    1 Claim ABSTRACT OF THE DISCLOSURE
1-isonitroso - 1,2,6,7,8,12b - hexahydrocyclopenta[d,e]
dibenzo[a,d]cycloocten-2-one is an intermediate in the
preparation of cyclopentadibenzocycloalkenes which are
useful pharmaceutically, e.g., 1 - amino - 2 - hydroxy-
1,2,6,7,8,12b - hexahydrocyclopenta[d,e]dibenzo[a,d]cy-
clooctene.

This application is a division of copending application
Ser. No. 455,989 filed May 14, 1965.
The present invention is directed to pharmaceutically
acceptable dibenzazulenes and cyclopentadibenzocyclo-
octenes, particularly those of the formula

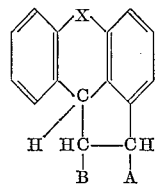

(I)

wherein
X is either dimethylene (—CH$_2$—CH$_2$—) or trimethylene
(—CH$_2$—CH$_2$—CH$_2$—);
A is a hydrogen atom (—H) or a hydroxyl (—OH);
B is either polymethyleneimino having from 2 to 6 meth-
ylene groups, e.g., ethyleneimino, propyleneimino, pyr-
rolidyl, piperidyl and hexamethyleneimino; or
—N(R$^1$)R$^2$
e.g., N-methyl-N-ethylamino; and
each of R$^1$ and R$^2$ is, independently, either a hydrogen
atom (—H) or lower alkyl, e.g., methyl, ethyl, propyl,
isopropyl and butyl;
which are antihypertensives and antiserotonins. The in-
vention is further directed to intermediates in the prep-
aration of Compounds I.
Irrespective of X (as defined heretofore), Compounds
I are prepared from corresponding (i.e. X is the same in
the starting material as it is in the final product) Com-
pounds II. Compounds II are 10,11-dihydro-5H-dibenzo
[a,d]cyclohepten-5-one (where X is dimethylene) and
5,10,11,12 - tetrahydrodibenzo[a,d]cycloocten - 5 - one
(where X is trimethylene).
The relationship between starting materials II, inter-
mediates and final products I is reflected in the following
flow sheet wherein the compounds are designated by
Roman numerals and the reactions by capital letters.
Reaction A is a condensation with t-butyl acetate and
diethylaminomagnesium bromide to give the hydroxy
ester III. Exemplifications of reactions A and B are known
[J. Org. Chem., 27, 230 (1962)].
Reaction B is the Reformatsky reaction with Br—CH$_2$—CO—O—(lower alkyl)

e.g. ethyl bromoacetate, followed by saponification and
dehydration. Reaction B is, alternatively, a condensation
with (lower)alkoxyacetylene, e.g. ethoxyacetylene, fol-
lowed by rearrangement and saponification to yield IV,
according to the general procedure outlined, e.g., by
Arens, G. F., Volume II, pages 157 to 161, "Advances in
Organic Chemistry," Interscience Publishers, Inc., New
York, New York, 1960.
Reaction C takes place in boiling xylene with p-toluene-
sulfonic acid as catalyst.
Reactions D and E (cyclization) are effected either
with a mixture of polyphosphoric acid and acetic acid or
with trifluoroacetic anhydride. When other cyclization re-
agents are employed, side products are formed to a greater
extent and/or the desired product undergoes further re-
actions, e.g. dimerization and condensation.
Reactions F and G are either standard hydrogenations
(preferred) or they are chemical reductions.
Reaction H (cyclization) is carried out preferably with
polyphosphoric acid, but other methods, e.g. Friedel-
Crafts cyclization of the corresponding chloride, may also
be used.

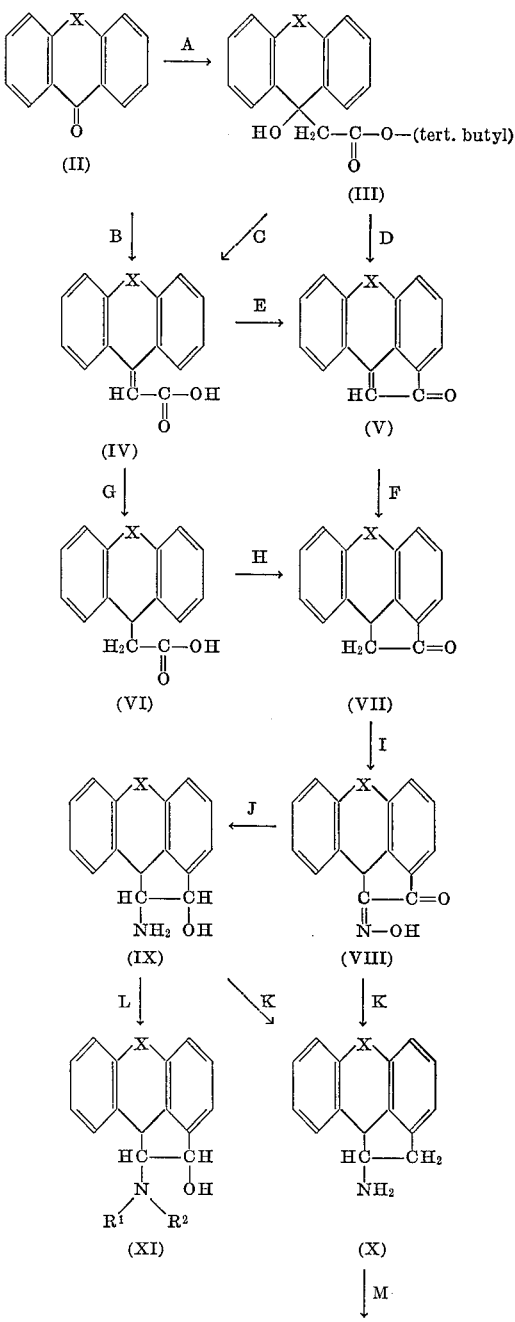

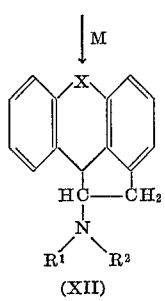

(XII)

Reaction I is a nitrosation, preferably with a (lower) alkyl nitrite, e.g., ethyl nitrite, butyl nitrite and amyl nitrite, in the presence of a strong anhydrous acid, preferably hydrogen chloride.

Reaction J is a (preferably catalytic) reduction in solution containing an alkali metal hydroxide, e.g. ethanolic potassium hydroxide. Preferred catalysts are nickel sponge and Raney nickel.

Reaction K is a (preferably catalytic) reduction in solution containing a strong acid, e.g. in glacial acetic containing either sulfuric acid or perchloric acid. The preferred catalysts are palladium or palladium/ charcoal.

Reactions L and M are alkylations.

Compounds I possess more than one asymmetric carbon atom. Both the geometric and the optical isomers of compounds I are within the scope of this invention, as well as racemates and racemic mixtures. Selected geometric isomers may be formed predominantly from reactions J and K; the geometric isomers formed are separable into chemical individuals by known methods. The separation of geometrical isomers and the resolution of racemic mixtures and racemates into their optical antipodes (enantiomers) do not form a part of this invention. Operable procedures for both are well known.

The present invention also includes the pharmaceutically acceptable acid addition salts of compounds I. These include such salts as the hydrochloride, hydrobromide, sulfuric acid, phosphoric acid, oxalic acid, fumaric acid, tartaric acid, citric acid, salicylic acid, benzoic acid, acetic acid, methane sulfonic acid, benzenesulfonic acid, sulfamic acid and toluene sulfonic acid salts of compounds I. The acid addition salts are prepared according to standard well-known procedures from the corresponding free base I.

Compounds I and their pharmaceutically acceptable acid addition salts are CNS (central nervous system) active compounds, which are useful as analgesics, sedatives and minor tranquilizers. They are also useful as antihypertensives, vasodilators and antihistamines. They are administered either orally or parenterally in daily doses of from 10 milligrams to 350 milligrams.

Each of the pharmaceutically active compounds of this invention, may be, e.g., incorporated, for oral administration, in a tablet as the sole active ingredient. A typical tablet is constituted by from 1 to 3 percent binder, e.g. tragacanth; from 3 to 10 percent disintegrating agent, e.g. corn starch; from 2 to 10 percent lubricant, e.g. talcum; from 0.25 to 1.0 percent lubricant, e.g. magnesium stearate; an average dosage of active ingredient; and q.s. 100 percent of filler, e.g. lactose; all percentages being by weight. Tablets are prepared according to standard tabletting techniques, which are well-known in the art, employing the necessary amounts of conventional granulating liquids, e.g. alcohol SD-30 and purified water. An exemplary tabletting formulation for the instant active compounds is:

| | Parts |
|---|---|
| Title compound of Example 11 | 25 |
| Tragacanth | 2 |
| Lactose | 64.5 |
| Corn starch | 5 |
| Talcum | 3 |
| Magnesium stearate | 0.5 |
| Alcohol SD-30, q.s. | |
| Purified water, q.s. | |

In each of the examples, the parts and percentages are by weight unless otherwise specified, and the temperatures are in degrees centigrade. The relationship between parts by weight and parts by volume is the same as that between the kilogram and the liter. The examples wherein X is dimethylene are equally illustrative of corresponding examples wherein X is trimethylene and vice versa.

EXAMPLE 1

5-carboxymethylidene-10,11-dihydro-5H-dibenzo[a,d]cycloheptene

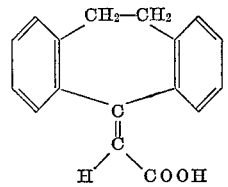

Heat a solution of 5 parts of para-toluenesulfonic acid in 1000 parts by volume of toluene under an azeotropic water-removal trap. Add to the solution 404 parts of 5-hydroxy-5-tert.-butyloxycarbonylmethyl - 10,11 - dihydro-5H-dibenzo[a,d]cycloheptene ["J. Org. Chem.," 27, 230 (1962)], and reflux the resulting mixture until 22 parts by volume of water are formed.

Concentrate the reflux to a very thick crystal slurry. Filter 215 parts of title compound, M.P. 167° to 170°, from the slurry. Recover an additional 94 parts of title compound from the mother liquor.

EXAMPLE 2

5-carboxymethyl-10,11-dihydro-5H-dibenzo[a,d]cycloheptene

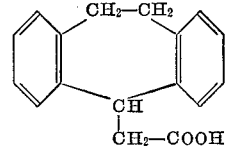

Shake a suspension of 10.0 parts of 5-carboxymethylidene-10,11-dihydro-5H-dibenzo[a,d]cycloheptene in 100 parts by volume of dioxane with 0.85 part of palladium-charcoal (10%) catalyst in a hydrogen atmosphere until the hydrogen consumption stops. Filter the resultant mixture and extract the catalyst with boiling chloroform. Evaporate the filtrate and extracts to obtain 10.0 parts of 5-carboxy-methyl-10,11-dihydro - 5H - dibenzo[a,d]cycloheptene, M.P. 161°.

EXAMPLE 3

1,2,6,7-tetrahydro-11bH-benzo[j]benz[c,d]azulen-2-one

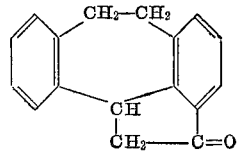

React a mixture of 9.6 parts of 5-carboxymethyl-10,11-dihydro-5H-dibenzo[a,d]cycloheptene and 150 parts of polyphosphoric acid at 90° for 150 minutes. Pour the reaction mixture onto ice. Filter the solid precipitate and wash thoroughly with 2 N aqueous sodium hydroxide solution to remove the unchanged starting material and side products. Recrystallize the resultant product from dimethyl formamide to obtain 7.8 parts of 1,2,6,7-tetrahydro-11bH-benzo[j]benz[c,d]azulen-2-one, M.P. 218°.

EXAMPLE 4

2,6,7,8-tetrahydrocyclopenta[d,e]dibenzo[a,d]cycloocten-2-one

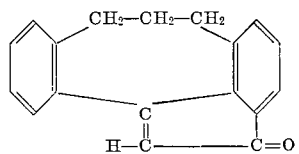

React 50 parts of 5,10,11,12-tetrahydrodibenzo[a,d]cycloocten-5-one with the Grignard derivative of 15.75 parts of ethoxy-acetylene in tetrahydrofuran, following the general method described by Arens, G. R., Volume II, pages 157 to 161, "Advances in Organic Chemistry," Interscience Publishers, Inc., New York, N.Y., 1960, Treat the crude product with acid, then saponify with alcoholic potassium hydroxide to isolate, after acidification, 5-carboxymethylidene - 5,10,11,12 - tetrahydrodibenzo[a,d]cycloocten, M.P. 170° to 172°. Dissolve 40 parts of the foregoing product with 60 parts of polyphosphoric acid in 600 parts of glacial acetic acid, and heat the resulting solution under reflux for 30 minutes. Pour the reaction mixture onto ice, and dissolve the resulting orange precipitate in chloroform. Wash the obtained chloroform solution with 2 N sodium hydroxide solution (aq) and dry; then evaporate the remaining chloroform solution to obtain 53.2 parts of an orange oil, which consists of 85% of the desired 2,6,7,8-tetrahydrocyclopenta[d,e]dibenzo[a,d]cycloocten-2-one and 15% of side product, 5-methylidene-5,10,11,12 - tetrahydrodibenzo[a,d]cyclooctene. Separate the pure title compound by chromatography.

EXAMPLE 5

1,2,6,7,8,12b-hexahydrocyclopenta[d,e]dibenzo[a,d]cycloocten-2-one

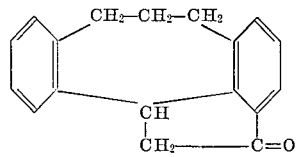

Shake 15.0 parts of 2,6,7,8-tetrahydrocyclopenta[d,e]dibenzo[a,d]cycloocten-2-one, dissolved in 200 parts by volume of ethyl acetate, with 2.0 parts of palladium-charcoal (5%) catalyst in a hydrogen atmosphere until one mole of hydrogen is taken up. Filter the resultant mixture, and evaporate the filtrate to dryness. Purify the residue by chromatography, and recrystallize from diethylether/petroleum ether to obtain the title compound, M.P. 102° to 104°.

EXAMPLE 6

1-isonitroso-1,2,6,7-tetrahydro-11bH-benzo[j]benz[c,d]azulen-2-one

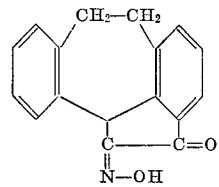

Suspend 56.2 parts of 1,2,6,7-tetrahydro-11bH-benzo[j]benz[c,d]azulen-2-one in a mixture of 360 parts by volume of dry benzene and 480 parts by volume of dry diethylether. Cool the obtained suspension to 0°. Thereafter introduce therein hydrogen chloride and add slowly 26.5 parts of n-butyl nitrite. Maintain the temperature with cooling and continue the introduction of hydrogen chloride for 3 hours. After the first of said 3 hours, however, add thereto an additional 240 parts by volume of dry benzene.

Filter the product and wash same with diethylether to obtain 51.2 parts of title compound, M.P. 224° to 225°. After recrystallization from normal propanol, the pure title compound melts at 229° to 230°.

EXAMPLE 7

1-isonitroso-1,2,6,7,8,12b-hexahydrocyclopenta[d,e]dibenzo[a,d]cycloocten-2-one

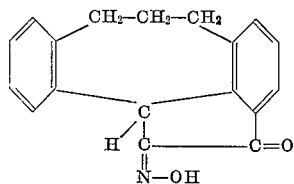

Suspend 59.0 parts of 1,2,6,7,8,12b-hexahydrocyclopenta[d,e]dibenzo[a,d]cycloocten-2-one in a mixture of 360 parts by volume of dry benzene and 480 parts by volume of dry diethylether. Cool the obtained suspension to 0°. Thereafter introduce therein hydrogen chloride and add slowly thereto 26.5 parts of n-butyl nitrite. Maintain the temperature at 0° with cooling and continue the introduction of hydrogen chloride for three hours. After the first of said three hours, however, add thereto an additional 240 parts by volume of dry benzene. Filter the resulting product to obtain the title compound.

EXAMPLE 8

1-amino-2-hydroxy-1,2,6,7-tetrahydro-11bH-benzo[j]benz[c,d]azulene

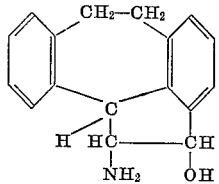

Hydrogenate at room temperature (20°) in contact with 25 parts of Raney nickel catalyst and under 500 p.s.i.g. hydrogen pressure 30.0 parts of 1-isonitroso-1,2,6,7 - tetrahydro - 11bH - benzo[j]benz[c,d]azulen-2-one suspended in a solution of 12.5 parts of sodium hydroxide in 250 parts by volume of 95% (aq.) methanol until 3 moles of hydrogen are taken up. Filter out the catalyst from the product. Add water to the filtrate, and filter the resulting precipitate to obtain 26.6 parts of title compound, M.P. 163° to 166°. The hydrochloride melts at 305° to 307° with decomposition.

EXAMPLE 9

1-amino-2-hydroxy-1,2,6,7,8,12b-hexahydrocyclopenta[d,e]dibenzo[a,d]-cyclooctene

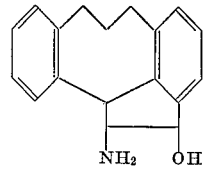

Hydrogenate at room temperature in contact with 25 parts of Raney nickel catalyst and under 500 p.s.i.g. hydrogen pressure 30.0 parts of 1-hydroximino-1,2,6,7,8,12b - hexahydrocyclopenta[d,e]dibenzo[a,d]cycloocten-2-one (title compound of Example 9) suspended in a solution of 12.5 parts of sodium hydroxide in 250 parts by volume of 95% (aq.) methanol until 3 moles of hydrogen are taken up. Filter the catalyst from the product. Add water to the filtrate, and filter the resulting precipitate which is the title compound.

EXAMPLE 10

1-methylamino-2-hydroxy-1,2,6,7-tetrahydro-11bH-benzo[j]benz[c,d]azulene

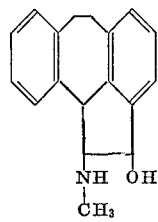

Reflux for 4 hours a mixture of 10 parts of 1-amino-2-hydroxy - 1,2,6,7 - tetrahydro - 11bH - benzo[j]benz[c,d]azulene, 4.2 parts of benzaldehyde, 0.01 part of piperidine and 60 parts by volume of ethanol. Thereafter, pour the refluxed material into ice water to obtain the N-benzylidene compound

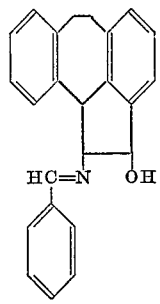

M.P. 164° to 167°. Hydrogenate said N-benzylidene compound (dissolved in 300 parts by volume of dioxane) in contact with Raney nickel catalyst until one mole of hydrogen is taken up. Filter out the catalyst, and evaporate the filtrate to dryness. Triturate the residue with diethylether to obtain 9.0 parts of the corresponding N-benzyl compound

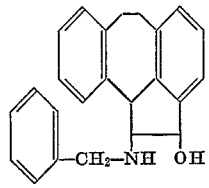

M.P. 145° to 148°. (The pure N-benzyl compound has a melting point of 157°.)

Boil for 4 hours a mixture of 8.9 parts of said N-benzyl compound, 6.75 parts by volume of formic acid (85%) and 2.40 parts by volume of 40% (aq.) formaldehyde solution. Cool the product prior to adding thereto 2 parts by volume of concentrated hydrochloric acid. Evaporate the resultant to dryness. From the thus-produced residue liberate the free base (N-benzyl-N-methyl compound)

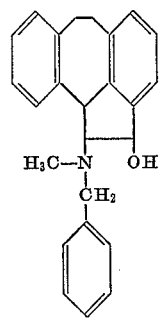

with 10% (aq.) sodium carbonate solution, and extract the resultant with chloroform.

Evaporate the chloroform extract to dryness, and dissolve the residue (9.8 parts) in dry diethylether. Introduce hydrogen chloride into the thus-prepared ether solution to obtain 10.5 parts of the hydrochloride, M.P. 182°, of the above-noted N-benzyl-N-methyl compound.

Dissolve said hydrochloride in 300 parts by volume of ethanol, and hydrogenate (in contact with 3 parts of 10% palladium/carbon catalyst) at 50° and under 50 p.s.i.g. hydrogen pressure. Filter the catalyst from the hydrogenated product, and evaporate the filtrate to dryness to obtain the hydrochloride, M.P. 253° to 254°, of the title compound. The free base, M.P. 180°, is prepared from its hydrochloride according to standard well-known procedures.

EXAMPLE 11

1-dimethylamino-2-hydroxy-1,2,6,7-tetrahydro-11bH-benzo[j]benz[c,d]azulene

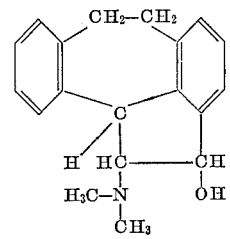

Heat for 4 hours at 100° a mixture of 8 parts of 1-amino - 2 - hydroxy - 1,2,6,7 - tetrahydro - 11bH - benzo-[j]benz[c,d]azulene, 10 parts by volume of 90% (aq.) formic acid and 7 parts by volume of 40% (aq.) formaldehyde solution. Cool the product to room temperature prior to adding thereto 4 parts of concentrated hydrochloric acid. Evaporate the resultant to dryness in vacuo to obtain the hydrochloride, M.P. 262° to 263°, of the title compound.

Liberate the free base with ammonia, and extract the product with chloroform to obtain 8 parts of the title compound, M.P. 168° to 172°.

EXAMPLE 12

1-amino-1,2,6,7-tetrahydro-11bH-benzo[j]benz-[c,d]azulene

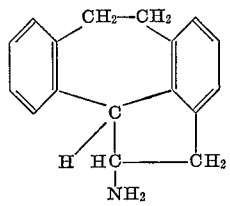

Hydrogenate at 60° in contact with 1 part of finely dispersed palladium metal and under 60 p.s.i.g. of hydrogen pressure a solution of 7 parts of 1 - amino - 2 - hydroxy - 1,2,6,7 - tetrahydro - 11bH - benzo[j]benz[c,d]-azulene in 150 parts by volume of glacial acetic acid and 6 parts by volume of concentrated sulfuric acid. After 1 mole of hydrogen has been taken up, filter off the catalyst and distill the acetic acid in vacuo from the filtrate.

Dilute the obtained product with water (50 parts by volume), make the resulting solution basic with sodium hydroxide, and extract the thus-produced basic solution with diethylether.

Dry the ether solution. Introduce hydrogen chloride into the dried ether solution to obtain the hydrochloride of the title compound. Recrystallize said hydrochloride, M.P. 328° dec., several times from ethanol/diethylether.

The title compound is freed from its hydrochloride according to standard well-known procedures.

EXAMPLE 13

1-N-piperidyl-2-hydroxy-1,2,6,7-tetrahydro-11bH-benzo[j]benzo[c,d]azulene

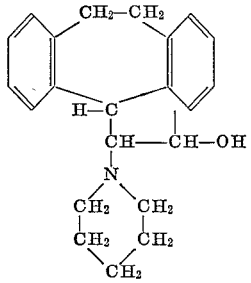

Admix 2.51 parts of 1 - amino - 2 - hydroxy - 1,2,6,7-tetrahydro - 11bH - benzo[j]benz[c,d]azulene, 2.30 parts of 1,5 - dibromopentane and 20 parts by volume of toluene and heat mixture under reflux for 3 hours. Add thereto 1.7 parts of sodium hydrocarbonate and 10 parts by volume of toluene and continue heating for an additional 15 hours. Cool the resultant to room temperature; add chloroform thereto; and wash the toluene-chloroform solution with water. Dry the above solution and precipitate the hydrochloride of the product by addition thereto of ethereal hydrochloric acid.

What is claimed is:

1. The compound of the formula:

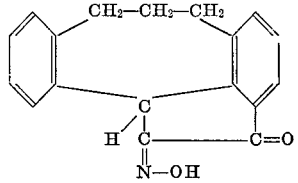

References Cited

UNITED STATES PATENTS 3,358,027   12/1967   Van der Stelt _____ 260—576
3,382,252   5/1968   Frey et al. _____ 260—247

LEON ZITVER, Primary Examiner

G. SCHWARTZ, Assistant Examiner